(12) United States Patent
Mastrolia (10) Patent No.: US 11,279,493 B1
(45) Date of Patent: Mar. 22, 2022

(54) PARACHUTE RISER ASSEMBLY

(71) Applicant: AMI Industries, Inc., Colorado Springs, CO (US)

(72) Inventor: Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 30 days.

(21) Appl. No.: 17/020,604

(22) Filed: Sep. 14, 2020

(51) Int. Cl.
*B64D 17/24* (2006.01)
*B64D 17/30* (2006.01)

(52) U.S. Cl.
CPC .............. *B64D 17/24* (2013.01); *B64D 17/30* (2013.01)

(58) Field of Classification Search
CPC ................................ B64D 17/24; B64D 17/30
See application file for complete search history.

(56) References Cited

U.S. PATENT DOCUMENTS

| | | | |
|---|---|---|---|
| 4,850,554 A | 7/1989 | Strong | |
| 2017/0106987 A1* | 4/2017 | Adams | B64D 17/00 |
| 2020/0094972 A1* | 3/2020 | Volny | B64D 17/24 |
| 2020/0094974 A1* | 3/2020 | Volny | B64D 25/02 |
| 2020/0094975 A1* | 3/2020 | Volny | B64D 17/30 |

\* cited by examiner

*Primary Examiner* — Justin M Benedik
(74) *Attorney, Agent, or Firm* — Snell & Wilmer L.L.P.

(57) ABSTRACT

A parachute riser assembly for a parachute comprises a left riser, a right riser, and a curtain. The left riser is configured to extend from a canopy and is configured to be coupled to a left attachment point of a harness worn by a user, according to various embodiments. Similarly, the right riser is configured to extend from the canopy and is configured to be coupled to a right attachment point of the harness, according to various embodiments. The curtain may be coupled to and may extend between the left riser and the right riser. In various embodiments, a portion of the curtain is configured to move along the left riser and the right riser from a furled state to an unfurled state in response to tensioning the left riser and the right riser.

20 Claims, 5 Drawing Sheets

PARACHUTE RISER ASSEMBLY

FIELD

The present disclosure relates to parachute riser assemblies, and in particular to providing neck support to parachute users in order to prevent neck hyperextension.

BACKGROUND

Various aircraft include one or more ejection seats configured to eject a pilot or other occupant from the aircraft during an emergency. When a pilot or other occupant ejects from an aircraft, the subsequent separation of the pilot from the ejection seat often results in the pilot experiencing neck hyperextensions in response to rapid tensioning of the parachute risers. This problem may be exacerbated by the fact that the weight of a pilot's helmet has been increasing as more sophisticated equipment and components are integrated and incorporated with the pilot's helmet (e.g., helmet mounted display components, etc.).

SUMMARY

In various embodiments, the present disclosure provides a parachute riser assembly for a parachute. The parachute riser assembly may include a left riser, a right riser, and a curtain. The left riser is configured to extend from a canopy and is configured to be coupled to a left attachment point of a harness worn by a user, according to various embodiments. Similarly, the right riser is configured to extend from the canopy and is configured to be coupled to a right attachment point of the harness, according to various embodiments. The curtain may be coupled to and may extend between the left riser and the right riser. In various embodiments, a portion of the curtain is configured to move along the left riser and the right riser from a furled state to an unfurled state in response to tensioning the left riser and the right riser.

In various embodiments, the curtain comprises a top edge and a bottom edge, wherein the bottom edge is the portion of the curtain that is configured to move along the left riser and the right riser such that the bottom edge moves down towards the harness along the left riser and the right riser in response to tensioning the left riser and the right riser via deployment of the parachute. In various embodiments, the top edge of the curtain is non-movably coupled to the left riser and the right riser such that the top edge is prevented from moving relative to the left riser and the right riser. In various embodiments, at least the bottom edge of the curtain comprises a sleeve structure that envelopes respective sections of the left riser and the right riser such that the sleeve structure enables the bottom edge of the curtain to be slidably coupled to the left riser and the right riser to allow the bottom edge of the curtain to slide along the left riser and the right riser towards the harness in response to deployment of the parachute.

In various embodiments, the parachute riser assembly further includes respective draw straps extending along the left riser and the right riser, wherein each draw strap of the respective draw straps comprises a first end coupled to a respective riser and a second end directly coupled to the portion of the curtain. In various embodiments, the parachute riser assembly further includes respective links affixed to the left riser and the right riser proximate the harness, wherein each draw strap of the respective draw straps extends through and bends substantially 180 degrees about one link of the respective links. In the furled state a first length of the left riser and the right riser, as measured between the respective links and the first end of the respective draw straps, is greater than a second length of the respective draw straps, also as measured between the respective links and the first end of the respective draw straps, according to various embodiments. In response to tensioning the left riser and the right riser, the second length of the respective draw straps is increased as the second end of the respective draw straps is pulled down towards the harness, thereby transitioning the curtain to the unfurled state and substantially equalizing the first length and the second length, according to various embodiments.

In various embodiments, a shape of a bottom edge of the curtain extending between the left riser and the right riser in the unfurled state is arcuate. In various embodiments, the left riser and the right riser are rear risers. In various embodiments, the parachute riser assembly further includes respective draw straps extending along the left riser and the right riser, wherein each draw strap of the respective draw straps comprises a first end coupled to a respective riser and a second end directly coupled to the portion of the curtain.

Also disclosed herein, according to various embodiments, is a parachute that includes a canopy, a left riser, a right riser, a curtain, and respective draw straps. The left riser may extend from the canopy and may be configured to be coupled to a left attachment point of a harness worn by a user. Similarly, the right riser may extend from the canopy and may be configured to be coupled to a right attachment point of the harness. The curtain may be coupled to and may extend between the left riser and the right riser. The respective draw straps may extend along the left riser and the right riser, wherein each draw strap of the respective draw straps comprises a first end coupled to a respective riser and a second end directly coupled to a portion of the curtain. In various embodiments, the portion of the curtain is configured to move along the left riser and the right riser from a furled state to an unfurled state in response to tensioning the left riser and the right riser.

In various embodiments, the parachute further includes respective links affixed to the left riser and the right riser proximate the harness, wherein each draw strap of the respective draw straps extends through and bends substantially 180 degrees about one link of the respective links. In the furled state a first length of the left riser and the right riser, as measured between the respective links and the first end of the respective draw straps, is greater than a second length of the respective draw straps, also as measured between the respective links and the first end of the respective draw straps. In various embodiments, in response to tensioning the left riser and the right riser, the second length of the respective draw straps is increased as the second end of the respective draw straps is pulled down towards the harness, thereby transitioning the curtain to the unfurled state and substantially equalizing the first length and the second length.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a parachute riser assembly configured to support the head and/or neck of a parachute user during parachute deployment. As described in greater detail below, the parachute riser assembly generally includes a curtain that transitions from a furled state to an unfurled state in response to tensioning the risers of the parachute (e.g., in response to parachute deployment), according to various embodiments. Although numerous details and examples are included herein pertaining to utilizing these concepts in conjunction with aircraft ejection systems, the present disclosure is not necessarily so limited, and thus aspects of the disclosed embodiments may be adapted for use in a variety of other parachute-related industries (e.g., non-ejection situations, such as skydiving, base jumping, etc.). As such, numerous applications of the present disclosure may be realized.

Figure 1:
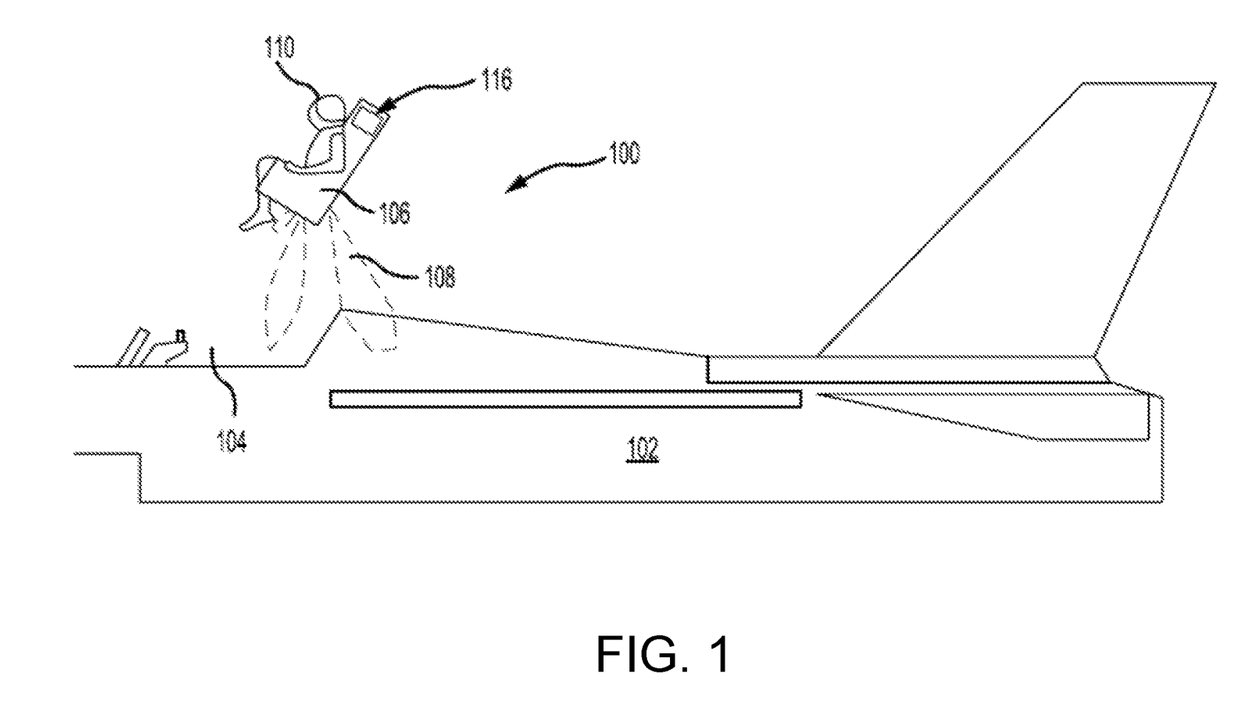
FIG. 1 is a schematic view of an aircraft ejection event, in accordance with various embodiments.

FIG. 1 is a schematic view of an aircraft ejection event, in accordance with various embodiments. FIG. 1 illustrates an aircraft ejection system 100, in accordance with various embodiments. The aircraft ejection system 100 may be installed in an aircraft 102 to safely expel an ejection seat 106 and a user 110 of the ejection seat 106 from a cockpit 104 of the aircraft 102. The ejection seat 106 may be urged from the cockpit 104 by a propulsion system 108. The aircraft ejection system 100 may include a parachute 116. In various embodiments, prior to deployment of the parachute 116, a portion of the parachute 116 may be stored within the ejection seat 106.

Figure 2A:
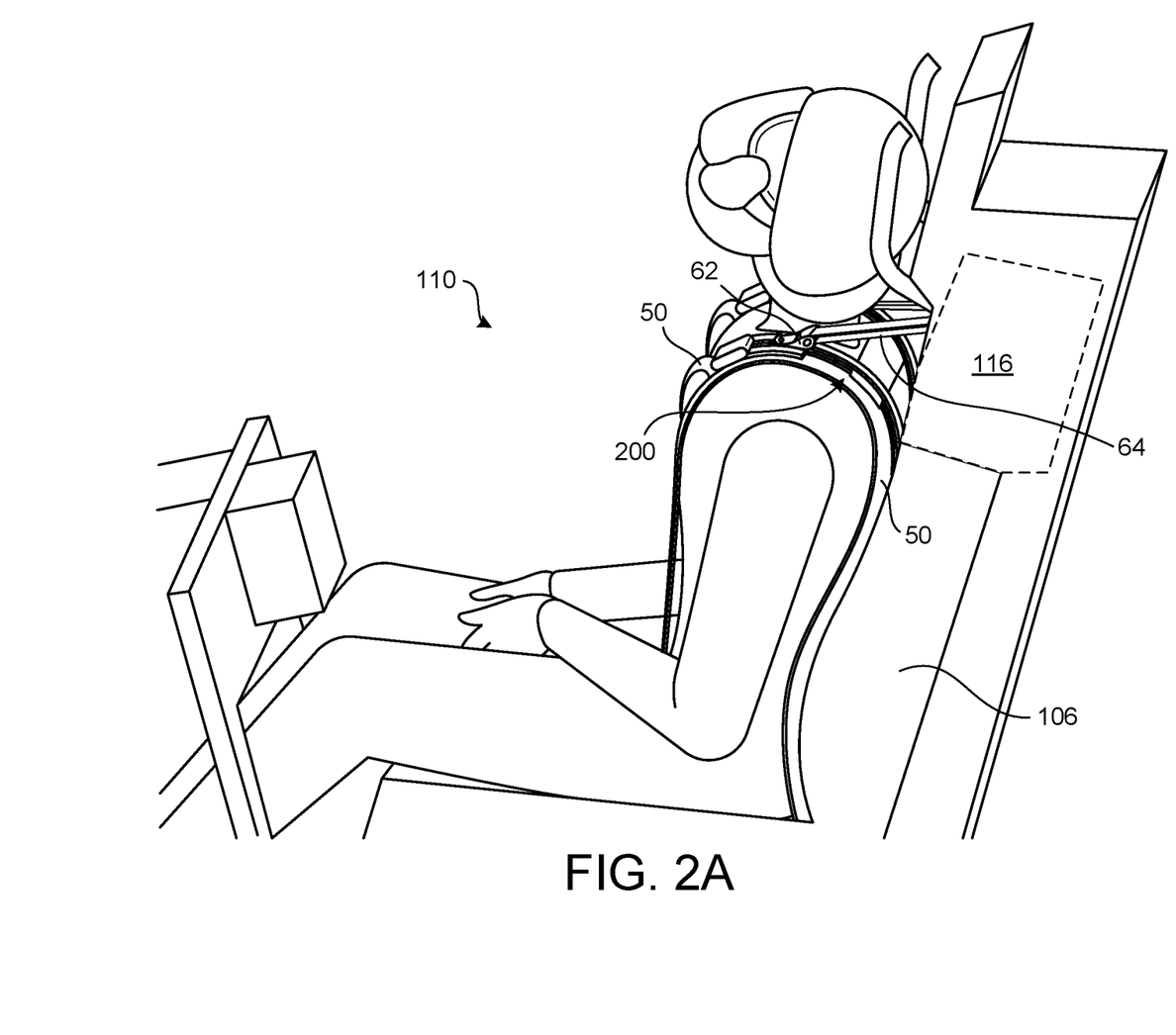
FIG. 2A is a perspective view of a user seated in an aircraft ejection seat with a parachute riser assembly coupled to the user's harness, in accordance with various embodiments.

In various embodiments, and with reference to FIG. 2A, a parachute riser assembly 200 is provided. Generally, the parachute riser assembly 200 is configured to extend from the canopy of a parachute 116 (which may be stored in the ejection seat 106) to a harness 50 worn by the user 110 (which may be a pilot, a crewperson, or other parachute user), according to various embodiments. Also shown in FIG. 2A, according to various embodiments, are inertial real straps 64 and roller fittings 62. The roller fittings 62 are coupled to the harness 50 and the inertial real straps 64 extend from the roller fittings 62 to the seat 106 in order to secure the user 110 to the seat 106. The inertial real straps 64 are configured to be released during seat-user separation after ejection. FIGS. 2B, 3A, 3B, 4A, and 4C show the roller fittings 62, but the inertial real straps 64 are purposefully omitted from these figures in order to avoid obscuring the clarity of the depiction of the parachute riser assembly 200.

Figure 2B:
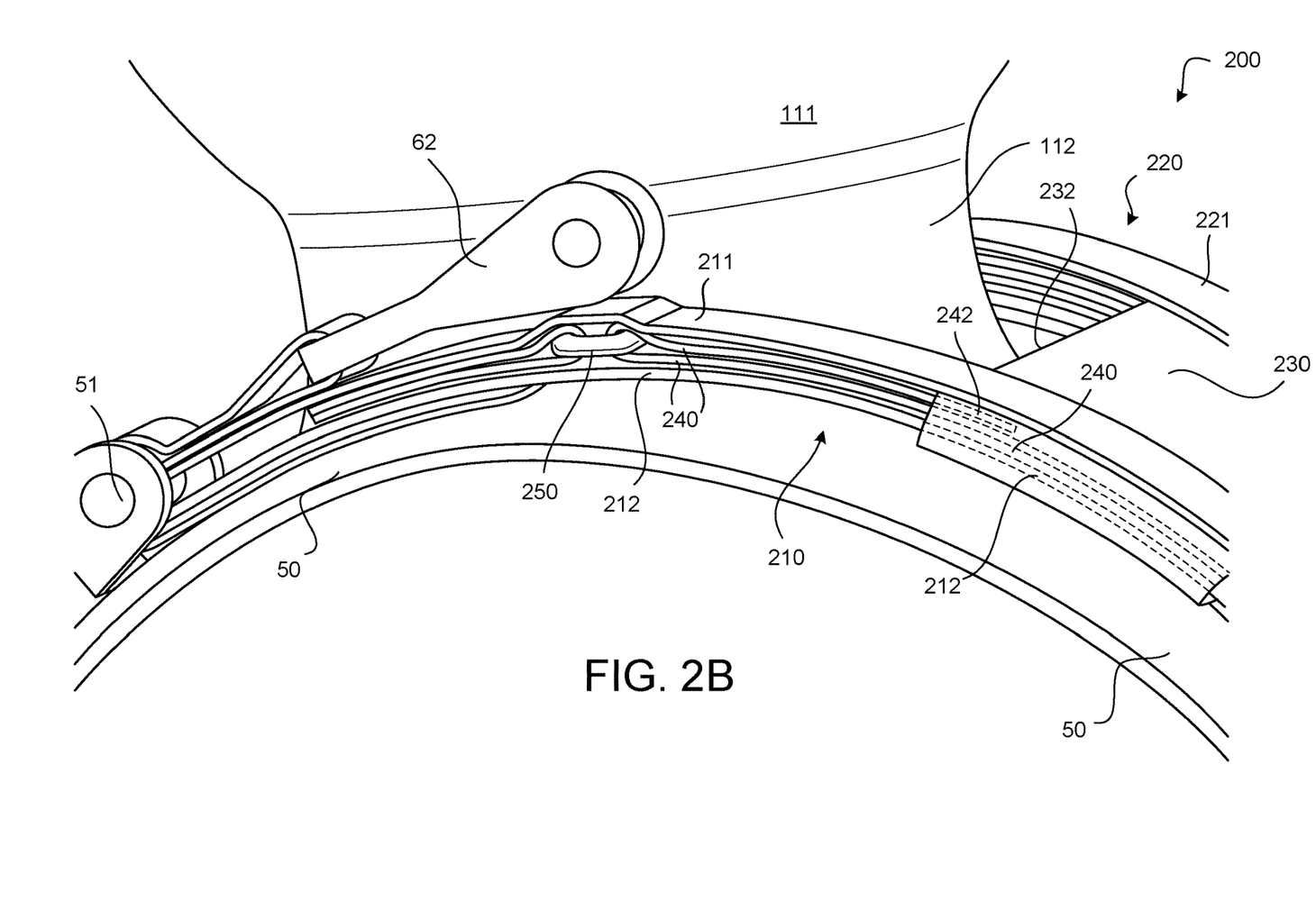
FIG. 2B is an enlarged perspective view of the parachute riser assembly of FIG. 2A, in accordance with various embodiments.

In various embodiments, and with reference to FIG. 2B, an enlarged view of the parachute riser assembly 200 is provided. The parachute riser assembly 200 generally includes one or more left risers 210 and one or more right risers 220 that extend from the canopy to an attachment point 51 of the harness 50 worn by the user 110, according to various embodiments. The one or more left risers 210 may include a left forward riser 211 and a left rear riser 212, while the one or more right risers 220 may include a right forward riser 221 and a right rear riser 222. The parachute riser assembly 200 may include a curtain 230 coupled to and between the left rear riser 212 and the right rear riser 222. As introduced above, the curtain 230 is generally configured to support the head 111 and/or neck 112 of the user 110 during deployment of the parachute, according to various embodiments. That is, during parachute deployment with conventional risers, the head of the parachute user would be pushed back between the risers in response to the deployment force of the parachute. With the curtain 230 in place between the risers, the rearward movement of head 111 and/or neck 112 of the user 110 is prevented (or at least mitigated) by the presence of the curtain 230.

In various embodiments the curtain 230 is coupled between the left rear riser 212 and the right rear riser 222 (as opposed to the corresponding forward risers, which would result in the head 111 and/or neck 112 of the user 110 being pushed to far forward or potentially covering the face of the user 110). Accordingly, the terms "left riser" and "right riser" as used below and in the claims refer to the respective rear risers 212, 222. In various embodiments, the attachment point 51 to which the parachute riser assembly 200 is coupled is forward of the user's shoulders. That is, the attachment point 51 may be proximate the chest of the user.

Figure 3A:
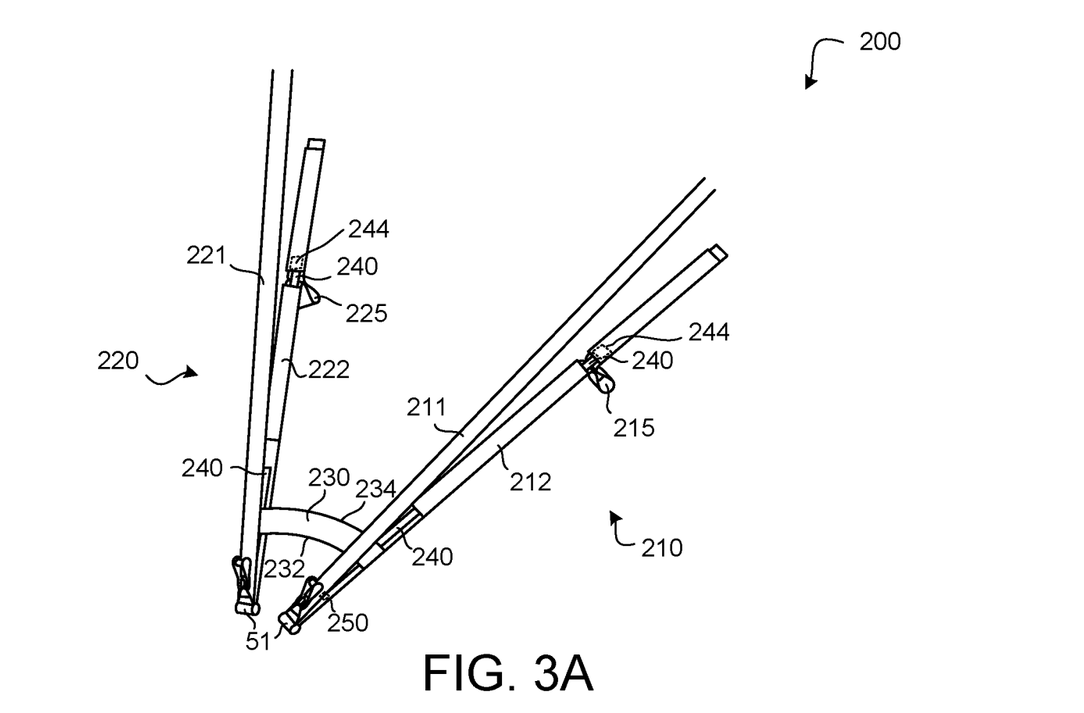
FIG. 3A is a perspective view of a parachute riser assembly with a curtain in a furled state, in accordance with various embodiments.

In various embodiments, and with continued reference to FIG. 2B, the curtain 230 comprises a bottom edge 232 and a top edge 234 (FIG. 3A). The terms "bottom," "down," "top," and "up" refer to relative positions of various components based on a standard orientation of the curtain 230 with the parachute in a deployed state, with the riser assembly 200 extending upward from the attachment point 51 to the canopy above the user 110. In various embodiments, the curtain 230 comprises a portion that is configured to move (e.g., slide) along the risers 212, 222 from a furled state to an unfurled state, as described in more detail below with reference to FIGS. 3A and 3B. With the curtain 230 having at least a portion thereof that can move along the risers 212, 222, the curtain 230 can transition from a collapsed/stowed configuration (i.e., the furled state) to an expanded/deployed configuration (i.e., the unfurled state). In various embodiments, the parachute riser assembly 200 further includes respective draw straps 240 and respective links 250 to facilitate the expansion of the curtain 230, as explained in greater detail below starting with reference to FIGS. 3A and 3B.

Figure 3B:
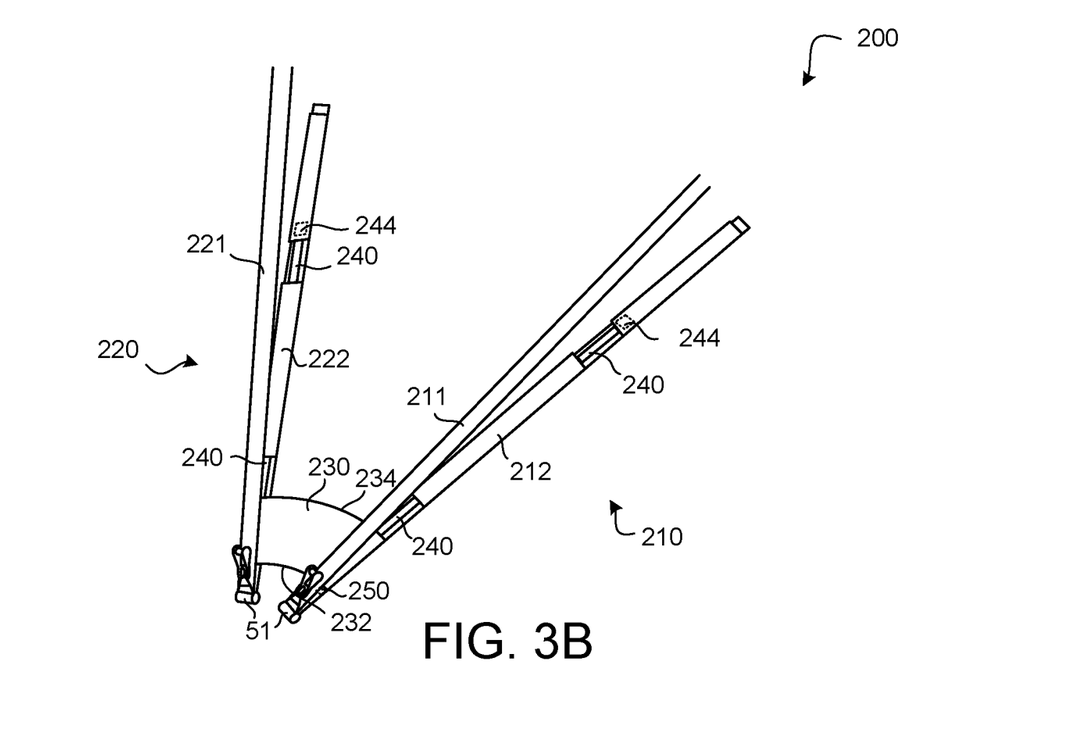
FIG. 3B is a perspective view of a parachute riser assembly with a curtain in an unfurled state, in accordance with various embodiments.

In various embodiments, and with reference to FIGS. 3A and 3B, the moveable portion of the curtain 230 is configured to move down towards the user. According to various embodiments, one of the benefits of having the curtain 230 comprise this downward-expanding configuration is that in the furled state, the bottom edge 232 of the curtain 230 remains a distance away from the neck 112 of the user (e.g., see FIG. 2B, with the bottom edge 232 of the curtain not being in direct contact with the neck 112 of the user). Such a configuration may provide various comfort and/or safety benefits to the user. For example, if a parachute assembly were to be implemented with a non-expanding neck support panel between the risers, the support panel would likely be in constant contact with the back of the neck of the user, which would be an uncomfortable and/or distracting nuisance to the user (e.g., a pilot) and could potentially cause harm/damage to the user, or otherwise create a hazardous situation.

In various embodiments, and with continued reference to FIGS. 3A and 3B, movement of the portion (e.g., the bottom edge 232) of the curtain 230 is configured to automatically occur in response to tensioning the left riser 212 and the right riser 222. Said differently, in response to the risers 212, 222 tensioning during a parachute deployment event, the curtain 230 may automatically transition from the furled state (FIG. 3A) to the unfurled state (FIG. 3B). In various embodiments, the curtain 230 may have a tapered, fan-like shape in the unfurled state. A shape of the bottom edge 232 of the curtain 230 may be arcuate, thus further improving the comfort that the user experiences with the curtain in the furled state (stowed configuration) and also potentially improving the ergonomics of the curtain 230 relative to the user's neck in the unfurled state (deployed configuration).

In various embodiments, the top edge 234 of the curtain is non-movably coupled (e.g., permanently affixed) to the left riser 212 and the right riser 222 such that the top edge 234 is prevented from moving relative to the left riser 212 and the right riser 222. In various embodiments, at least the bottom edge 232 of the curtain 230 comprises a sleeve structure that envelopes respective sections of the left riser 212 and the right riser 222 such that the sleeve structure enables the risers 212, 222 to be received within and extend through the sleeve structure. Said differently, the sleeve structure of the curtain 230 may allow for the bottom edge 232 of the curtain 230, which is positioned around the risers 212, 222, to slide along the risers 212, 222 towards the harness 50. This sliding movement may be facilitated by the draw straps 240 and the links 250, as described in greater detail below.

Figure 4A:
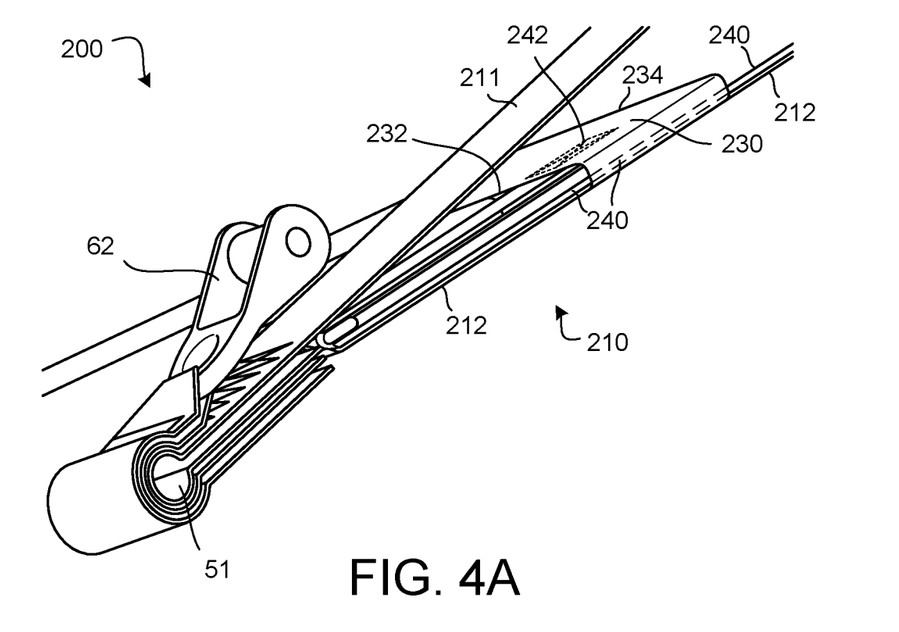
FIG. 4A is a perspective view of a parachute riser assembly with a curtain in a furled state, in accordance with various embodiments.
Figure 4B:
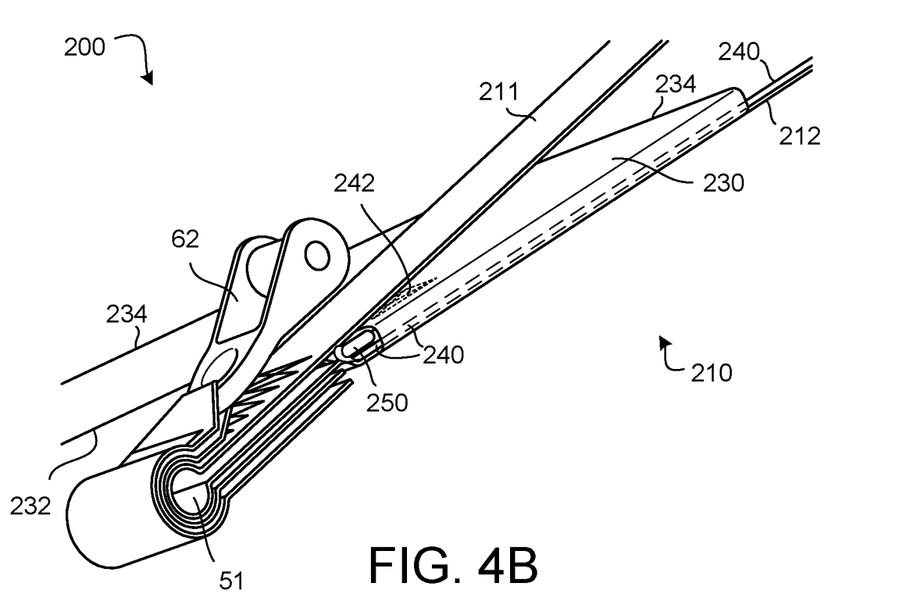
FIG. 4B is a perspective view of a parachute riser assembly with a curtain in an unfurled state, in accordance with various embodiments.

In various embodiments, and with reference to FIGS. 3A and 3B, the parachute riser assembly 200 includes draw straps 240 that respectively extend along at least a section/segment of the left riser 212 and the right riser 222. The draw straps 240, according to various embodiments, may be generally configured to facilitate the automatic transition of the curtain from the furled state to the unfurled state. For example, according to various embodiments, each draw strap 240 has a first end 244 (FIGS. 3A and 3B) that is coupled to a respective riser above the curtain 230 and a second end 242 (FIGS. 2B, 4A, and 4B) that is coupled to the moveable portion (e.g., the bottom edge 232) of the curtain 230.

In various embodiments, the parachute riser assembly 200 further includes respective links 250 affixed to the left riser 212 and the right riser 222 proximate the attachment point of the harness 50. The links 250 may function as pulleys through which the draw straps 240 are configured to move in response to tensioning the risers during parachute deployment. For example, each draw strap 240 may extend through and bend substantially 180 degrees about one of the links 250 (FIG. 2B shows this very clearly). Returning to reference FIGS. 3A and 3B, a first length of the risers 212, 222, as measured between the respective links 250 and the first end 244 of the draw straps 240, is greater than a second length of the respective draw straps 240, also as measured between the respective links 250 and the first end 244 of the draw straps. That is, with the curtain in the furled state, the risers 212, 222 may include loops 215 of excess material that contribute to the risers 212, 222 having a greater length between the two reference points (the respective links 250 and the first end 244 of the respective draw straps 240). These loops 215 of excess length of the risers 212, 222 may become tensioned during parachute deployment, and as the slack of these loops 215 is taken up, the second end 242 of each draw strap 240, which is redirected around the link 250 and is attached to the bottom edge 232 of the curtain 230, is pulled down towards the harness, thereby causing the curtain 230 to unfurl or expand. That is, in response to tensioning the left riser 212 and the right riser 222, the second length of the respective draw straps 240 (i.e., the length of the draw straps between the links 250 and the first ends 244 thereof) is increased as the draw strap 240 pulls on its second end 242 to meet the now fully taught first length of the risers 212, 222. The second end 242 of the respective draw straps 240 is thus pulled down towards the harness 50, thereby transitioning the curtain 230 to the unfurled state and substantially equalizing the first length and the second length.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Surface shading lines may be used throughout the figures to denote different parts or areas but not necessarily to denote the same or different materials. In some cases, reference coordinates may be specific to each figure.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A parachute riser assembly for a parachute, the parachute riser assembly comprising:
   a left riser configured to extend from a canopy and configured to be coupled to a left attachment point of a harness worn by a user;
   a right riser configured to extend from the canopy and configured to be coupled to a right attachment point of the harness; and
   a curtain coupled to and extending between the left riser and the right riser;
   wherein a portion of the curtain is configured to move along the left riser and the right riser from a furled state to an unfurled state in response to tensioning the left riser and the right riser.

2. The parachute riser assembly of claim 1, wherein the curtain comprises a top edge and a bottom edge, wherein the bottom edge is the portion of the curtain that is configured to move along the left riser and the right riser such that the bottom edge moves down towards the harness along the left riser and the right riser in response to tensioning the left riser and the right riser via deployment of the parachute.

3. The parachute riser assembly of claim 2, wherein the top edge of the curtain is non-movably coupled to the left riser and the right riser such that the top edge is prevented from moving relative to the left riser and the right riser.

4. The parachute riser assembly of claim 3, wherein at least the bottom edge of the curtain comprises a sleeve structure that envelopes respective sections of the left riser and the right riser such that the sleeve structure enables the bottom edge of the curtain to be slidably coupled to the left riser and the right riser to allow the bottom edge of the curtain to slide along the left riser and the right riser towards the harness in response to deployment of the parachute.

5. The parachute riser assembly of claim 4, further comprising respective draw straps extending along the left riser and the right riser, wherein each draw strap of the respective draw straps comprises a first end coupled to a respective riser and a second end directly coupled to the portion of the curtain.

6. The parachute riser assembly of claim 5, further comprising respective links affixed to the left riser and the right riser proximate the harness, wherein each draw strap of the respective draw straps extends through and bends substantially 180 degrees about one link of the respective links.

7. The parachute riser assembly of claim 6, wherein in the furled state a first length of the left riser and the right riser, as measured between the respective links and the first end of the respective draw straps, is greater than a second length of the respective draw straps, also as measured between the respective links and the first end of the respective draw straps.

8. The parachute riser assembly of claim 7, wherein, in response to tensioning the left riser and the right riser, the second length of the respective draw straps is increased as the second end of the respective draw straps is pulled down towards the harness, thereby transitioning the curtain to the unfurled state and substantially equalizing the first length and the second length.

9. The parachute riser assembly of claim 1, wherein a shape of a bottom edge of the curtain extending between the left riser and the right riser in the unfurled state is arcuate.

10. The parachute riser assembly of claim 1, wherein the left riser and the right riser are rear risers.

11. The parachute riser assembly of claim 1, further comprising respective draw straps extending along the left riser and the right riser, wherein each draw strap of the respective draw straps comprises a first end coupled to a respective riser and a second end directly coupled to the portion of the curtain.

12. A parachute comprising:
a canopy;
a left riser extending from the canopy and configured to be coupled to a left attachment point of a harness worn by a user;
a right riser extending from the canopy and configured to be coupled to a right attachment point of the harness;
a curtain coupled to and extending between the left riser and the right riser; and
respective draw straps extending along the left riser and the right riser, wherein each draw strap of the respective draw straps comprises a first end coupled to a respective riser and a second end directly coupled to a portion of the curtain;
wherein the portion of the curtain is configured to move along the left riser and the right riser from a furled state to an unfurled state in response to tensioning the left riser and the right riser.

13. The parachute of claim 12, wherein the curtain comprises a top edge and a bottom edge, wherein the bottom edge is the portion of the curtain that is configured to move along the left riser and the right riser such that the bottom edge moves down towards the harness along the left riser and the right riser in response to tensioning the left riser and the right riser via deployment of the parachute.

14. The parachute of claim 13, wherein the top edge of the curtain is non-movably coupled to the left riser and the right riser such that the top edge is prevented from moving relative to the left riser and the right riser.

15. The parachute of claim 14, wherein at least the bottom edge of the curtain comprises a sleeve structure that envelopes respective sections of the left riser and the right riser such that the sleeve structure enables the bottom edge of the curtain to be slidably coupled to the left riser and the right riser to allow the bottom edge of the curtain to slide along the left riser and the right riser towards the harness in response to deployment of the parachute.

16. The parachute of claim 15, further comprising respective links affixed to the left riser and the right riser proximate the harness, wherein each draw strap of the respective draw straps extends through and bends substantially 180 degrees about one link of the respective links.

17. The parachute of claim 16, wherein in the furled state a first length of the left riser and the right riser, as measured between the respective links and the first end of the respective draw straps, is greater than a second length of the respective draw straps, also as measured between the respective links and the first end of the respective draw straps.

18. The parachute of claim 17, wherein, in response to tensioning the left riser and the right riser, the second length of the respective draw straps is increased as the second end of the respective draw straps is pulled down towards the harness, thereby transitioning the curtain to the unfurled state and substantially equalizing the first length and the second length.

19. The parachute of claim 12, wherein a shape of a bottom edge of the curtain extending between the left riser and the right riser in the unfurled state is arcuate.

20. A parachute comprising:
a canopy;
a left riser extending from the canopy and configured to be coupled to a left attachment point of a harness worn by a user;
a right riser extending from the canopy and configured to be coupled to a right attachment point of the harness;
a curtain coupled to and extending between the left riser and the right riser;
respective draw straps extending along the left riser and the right riser, wherein each draw strap of the respective draw straps comprises a first end coupled to a respective riser and a second end directly coupled to a portion of the curtain; and
respective links affixed to the left riser and the right riser proximate the harness, wherein each draw strap of the respective draw straps extends through and bends substantially 180 degrees about one link of the respective links;
wherein the portion of the curtain is configured to move along the left riser and the right riser from a furled state to an unfurled state in response to tensioning the left riser and the right riser.

\* \* \* \* \*

UNITED STATES PATENT AND TRADEMARK OFFICE
CERTIFICATE OF CORRECTION

| | | |
|---|---|---|
| PATENT NO. | : 11,279,493 B1 | Page 1 of 1 |
| APPLICATION NO. | : 17/020604 | |
| DATED | : March 22, 2022 | |
| INVENTOR(S) | : Bradley Mastrolia | |

It is certified that error appears in the above-identified patent and that said Letters Patent is hereby corrected as shown below:

On the Title Page

Column 1, please insert -- Prior Publication Data US 2022/0081120 A1 Mar. 17, 2022 --

Signed and Sealed this
Fifth Day of July, 2022

Katherine Kelly Vidal
*Director of the United States Patent and Trademark Office*